(12) United States Patent
Bachmutsky

(10) Patent No.: US 7,738,370 B2
(45) Date of Patent: Jun. 15, 2010

(54) METHOD, NETWORK ELEMENT AND MODULES THEREFORE, AND COMPUTER PROGRAM FOR USE IN PRIORITIZING A PLURALITY OF QUEUING ENTITIES

(75) Inventor: Alexander Bachmutsky, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 783 days.

(21) Appl. No.: 11/640,218

(22) Filed: Dec. 18, 2006

(65) Prior Publication Data
US 2008/0144496 A1 Jun. 19, 2008

(51) Int. Cl.
*H04L 12/26* (2006.01)
(52) U.S. Cl. .................. 370/230; 370/235; 370/429
(58) Field of Classification Search ................ 370/230, 370/230.1, 231, 232, 235, 235.1, 237, 238, 370/428, 429, 389, 391, 392, 394
See application file for complete search history.

(56) References Cited

U.S. PATENT DOCUMENTS

| | | | | |
|---|---|---|---|---|
| 7,061,862 B2 * | 6/2006 | Horiguchi et al. | ........... | 370/230 |
| 7,573,820 B2 * | 8/2009 | Krishnaswamy et al. | ..... | 370/235 |
| 7,656,796 B1 * | 2/2010 | Ciavattone | ................. | 370/230 |
| 2002/0044563 A1 * | 4/2002 | Magill et al. | ................ | 370/411 |
| 2002/0194362 A1 * | 12/2002 | Rawlins et al. | .............. | 709/235 |
| 2003/0214954 A1 | 11/2003 | Oldak et al. | | |
| 2004/0085964 A1 * | 5/2004 | Vaananen | ................ | 370/395.4 |
| 2004/0208122 A1 * | 10/2004 | McDysan | ................... | 370/230 |
| 2006/0187836 A1 * | 8/2006 | Frey et al. | ................... | 370/235 |
| 2007/0153818 A1 * | 7/2007 | Lakshmanamurthy et al. | .... | 370/412 |
| 2008/0108349 A1 * | 5/2008 | Ihattula | ................... | 455/435.1 |
| 2009/0059937 A1 * | 3/2009 | Kanada | ...................... | 370/401 |

FOREIGN PATENT DOCUMENTS

| | | |
|---|---|---|
| EP | 0 275 678 A1 | 7/1988 |
| EP | 1 180 876 A1 | 2/2002 |

OTHER PUBLICATIONS

XP-002220520; Blake, et al.; RFC 2475; "An Architecture for Differentiated Services"; Dec. 1988; pp. 1-36.

(Continued)

*Primary Examiner*—Chi H. Pham
*Assistant Examiner*—Kevin Mew
(74) *Attorney, Agent, or Firm*—Alston & Bird LLP

(57) ABSTRACT

It is disclosed a method comprising prioritizing a plurality of queuing entities with respect to each other, receiving a data stream consisting of a plurality of data packets, marking each of the plurality of data packets with one out of a plurality of identifiers based on a predetermined requirement, the plurality of identifiers corresponding to the plurality of queuing entities, enforcing each one of the plurality of data packets based on the respective identifier, comprising detecting the identifier in each one of the plurality of marked data packets, and queuing, responsive to the detecting, the data packets into one of the plurality of prioritized queuing entities, scheduling, in each of the plurality of prioritized queuing entities, the respective queued data packets, and transmitting the scheduled data packets in each of the plurality of prioritized queuing entities according to the priority of the respective queuing entity.

26 Claims, 8 Drawing Sheets

OTHER PUBLICATIONS

XP-002171920; Nichols et al.; RFC 2474; "Definition of the Differentiated Services Field (DS Filed) in the IPv4 and IPv6 Headers"; Dec. 1988; pp. 1-20.

XP-015008380; Heinanen, et al.; "Assured Forwarding PHB Group"; Jun. 1999; pp. 1-11.

International Search Report, PCT/EP2007/063608 filed Dec. 10, 2007.

Tony Jeffree, et al., "IEEE Standard for Local and metropolitan area networks, Virtual Bridged Local Area Networks, Amendment 4: provider Bridges", May 26, 2006, a total of 73 sheets.

K. Nichols, et al., "Definition of the Differentiated Services Field (DS Field) in the IPv4 and IPv6 Headers", Dec. 1998, a total of 20 sheets.

"WRED—Explicit Congestion Notification", Cisco Systems, Inc., 2005, a total of 8 sheets.

* cited by examiner

METHOD, NETWORK ELEMENT AND MODULES THEREFORE, AND COMPUTER PROGRAM FOR USE IN PRIORITIZING A PLURALITY OF QUEUING ENTITIES

FIELD OF THE INVENTION

The present invention relates to a method, a network element and modules therefore, and a computer program for use in prioritizing a plurality of queuing entities. In particular, the present invention is advantageously applicable to loose QoS (Quality of Service) enforcement in packet-switched communication networks.

BACKGROUND

Communication technology has made considerable progress in recent years. Concerning especially packet-switched communication networks, an ever rising demand for fulfilling differentiated QoS requirements, e.g. sophisticated PHB (per hop behavior), has emerged. Such differentiated QoS requirements are necessary to accommodate e.g. a data packet stream belonging to a VoIP (Voice over Internet Protocol) end-to-end connection between e.g. mobile stations of one or more end users, which VoIP data packet stream requires a higher priority for its data packets to hop from one network node to another than e.g. a data packet stream associated with a data download between two data terminals. Both of the above data packet streams may be relayed over one or more common routers, resulting in a need to prioritize the VoIP data packet stream, which is more sensitive to e.g. data packet loss, data packet travel delay, data packet travel delay variation ("jitter") and data packet arrival misalignment, over the data download data packet stream being less sensitive to such effects.

The terminal(s) of the one or more end user(s) of the end-to-end connection may access the packet-switched network via an access technology, e.g. the WiMAX (Worldwide Interoperability for Microwave Access) technology. Other access technologies may be deployed, like e.g. WLAN (Wireless Local Access Network), xDSL (Digital Subscriber Line), xPON (Passive Optical Network) or a cable modem. The end-to-end connection may be terminated by a gateway entity (connected e.g. to a base station) of a network element.

For the purpose of the present invention to be described herein below, it should be noted that

- an access technology may be any of the above-described technologies by means of which a terminal can access a communication network. Although in the following only WiMAX is used as an exemplary access technology for descriptive purposes, other present or future technologies, such as the technologies described above or BlueTooth©, Infrared, and the like may be used; although the above technologies are mostly wireless access technologies, e.g. in different radio spectra, access technology in the sense of the present invention may also imply wirebound technologies;
- a terminal in turn may for example be any device, unit or means by means of which a user accesses a communication network, i.e. at least one network element thereof; this implies that a terminal as referred to in the present specification may correspond to a mobile as well as a non-mobile device, independent of the technology platform on which the terminal is based;
- generally, the present invention is advantageously applicable in those network/terminal environments relying on a data packet based transmission scheme according to which data are transmitted in data packets and which are for example based on the Internet Protocol IP. In particular examples of the present invention, IPv4 (IP version 4) and IPv6 (IP version 6) are applied. The present invention is, however, not limited thereto, and any other present or future IP or MIP (mobile IP) version, or, more generally, a protocol following similar principles as IPv4 and/or IPv6, is also applicable;
- a data packet may for example be any data structure for network traffic, comprising a header section and a data payload section, and consisting of information elements (e.g. bits) in a consecutive (e.g. in signal bursts) or distributed (e.g. spreading codes) fashion;
- a data packet header is for example any data structure comprising at least one information element required for network traffic routing, and may be, despite of its name, a heading, a trailing or an intermediate data structure for its associated data packet;
- a network element may for example be any device, unit or means by means of which a terminal may have access to a communication network and that provides gateway functionality for enabling a terminal to experience services provided by the communication network;
- an access entity as a network element or at least as a part of a network element may for example be any device, unit or means by which a user can access to a communication network based on an access technology;
- a gateway entity as a network element or at least as a part of a network element may be any device, unit or means by which the access termination for the terminals of an end-to-end connection can be performed;
- an anchor may for example be any functionality which in case of a mobile terminal provides, in the connection path from the communication network to the mobile terminal, the last location at which the connection is relayed over a fixed entity. In case of e.g. the gateway entity providing anchor functionality, the access entities following in the communication path may be selected according to the requirements of e.g. a handover between access entities;
- a U-plane (user plane) may for example refer to a hierarchic layer in a communication network dedicated to user data;
- a C-plane (control plane) may for example refer to a hierarchic layer in a communication network dedicated to signalling;
- a routing entity may for example be any device, unit or means, which is situated between the network elements or is formed integrally in at least one network element, for routing data packets from one end-to-end termination to another;
- method steps likely to be implemented as software code portions and being run using a processor at the network element, are software code independent and can be specified using any known or future developed programming language as long as the functionality defined by the method steps is preserved;
- generally, any method step is suitable to be implemented as software or by hardware without changing the idea of the present invention in terms of the functionality implemented;
- method steps and/or devices, units or means likely to be implemented as hardware components at a terminal or network element or module thereof are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. network elements or modules thereof) can be implemented as individual devices, units or means, but this does not exclude that they are implemented in a distributed fashion throughout the system, as long as the functionality of the device, unit or means is preserved.

Various approaches have been conducted in order to provide and to manage differentiated QoS requirements.

One such approach suggests a so-called drop eligibility marking for the data packets of BE (Best Effort, per default lowest PHB priority) network traffic as drop eligible. In case the data packets of BE traffic interfere with data packets of a Critical Application, the BE traffic data packets may be dropped.

Another approach defines a so-called DSCP (Differentiated Services Codepoint) to be bit #0 to bit #5 of the data packet header's IPv4 ToS (Type of Service) field or IPv6 Traffic Class field, respectively, and introduces three pools of codepoints, namely Pool 1:xxxxx0, Pool 2: xxxx11, Pool 3: xxxx01, wherein x can adopt the bit values 0 and 1.

FIG. 1 shows an example architecture (as e.g. applied in the WiMAX Forum QoS architecture) of a communication network 100 comprising an ASN (Access Service Network) 101, a mobile station MS 102 and a NSP (network service provider) network 103.

The network element 101 comprises a base station BS 1011 for SFM (Service Flow Management), which may constitute an access entity 1011, a Serving ASN-GW (ASN-Gateway) 1012 for SFA (Service Flow Authorization), which may, together with a U-Anchor (User plane anchor) ASN-GW 1014 e.g. for MS 102, constitute a gateway entity 1012, 1014, and a C-Anchor (Control plane anchor) ASN-GW 1013 e.g. for MS 102.

The NSP network 103 comprises a Home NSP 1031 and a Visited NSP 1032, through which ASN 101 is arranged to acquire e.g. the subscriber QoS profile of the MS 102 from an AAA (Authentication, Authorization and Accounting) entity via, if necessary, a PAAA (Proxy AAA) entity of the Visited NSP 1032.

For further details concerning e.g. definitions of the reference points R1 to R6, see WiMAX Stage 2 and 3 specifications, which provide extensive capabilities for QoS handling in both Control and User Planes. As shown in FIG. 1, the QoS functionality is very sophisticated, enabling checking against local policies in several domains by means of e.g. PFs (Policy Functions) performed on the basis of the Home and Visited NSP policy data bases, and by means of the Local Policy Database in or accessible to the gateway entity 1012, 1014 and the Local Resource Information in or accessible to the access entity 1011.

The resulting complexity is very high at the Control Plane and may potentially be too strict at the User plane.

Concerning handling of QoS enforcement in the existing WiMAX architecture according to FIG. 1, this QoS enforcement is performed either in the U-anchor ASN-GW 1014 according to FIG. 2 or the Serving ASN-GW according to FIG. 3.

Both schemes for QoS enforcement shown in FIGS. 2 and 3 are either too strict or suboptimal in their location. In the case of U-anchor QoS enforcement (see FIG. 2), there is a significant potential of dropping data packets unnecessarily. In this context, unnecessarily can be considered from two different points of view, being the one of the terminal's end user and the one of the (communication) network operator.

In some cases, network operators may desire to enforce a certain level of QoS if network resources are limited e.g. due to limited UL/DL (Uplink/Downlink) capacity of e.g. a mobile station and/or network congestion occurrence, while providing a better level of service is of less significance as long as the above problems do not impose a limiting factor. One of example therefore resides e.g. in traffic during off-peak hours, especially at night when the traffic load on the network is relatively low. In many cases, time-dependent policies (depending e.g. on times of traffic peak, off-peak, night, etc.) tend to become too complex to manage and to provide, and might be too restrictive without taking into account current traffic conditions (for example, some end users deciding to perform resource-consuming corporate backup services at night).

End users might also experience service degradation even below their signed QoS level e.g. because of network data packet bursts. In general, connection between a CSN (Connectivity Service Network), like e.g. a HA (Home Agent) according to FIGS. 2 and 3 for seamless service continuity and the U-anchor ASN-GW 1014 may be performed at very high speeds (e.g. 1 Gbps to 10 Gbps). In most cases, the routing entities transmit, per default behaviour, data packets in data packet bursts, i.e. data packets are buffered for some amount of time and are transmitted substantially at the same time. Such data packet bursts can cause short-peak rates for a specific end user that might cause unnecessary data packet drop.

In the case of QoS enforcement in Serving ASN-GW 1012, as shown in FIG. 3, a potential intermediate network between the U-anchor ASN-GW 1014 and the Serving ASN-GW 1012 (in FIG. 3, only a single R4 connection is shown, but in general, multiple R4 connections are possible) might be imposed with a heavy traffic load.

In this context, still another approach suggests to utilize a so-called ECN (Explicit Congestion Notification) field consisting of bit #6 (ECT: ECN-capable transport) and bit #7 (CE: Congestion Experienced) of the data packet header's IPv4 ToS field or IPv6 Traffic Class field, respectively, for routing data packets. This is achieved by:

1. Communicating between the terminals so as to detect whether or not both terminals are mutually ECN-capable, i.e. whether or not the ECN field will be handled.
2. Marking each data packet based on the detected ECN-capability in the ECN field by the sending terminal.
3. Relaying data packets for the end-to-end connection via at least one ECN-capable routing entity depending on the ECN field and depending on whether the number of data packets in the queuing entity is between a minimum threshold and a maximum threshold. Therein, ECN field "00" indicates lack of ECN-capability, and the data packet may be dropped based on other QoS considerations. ECN fields "10" and "01" (referred to as ECT(0) and ECT(1)) are treated the same, namely the ECN field is changed to "11" if the data packet would have been dropped based on QoS considerations, and the data packet is relayed further.
4. Relaying further data packets, wherein data packets having an ECN field 11 are interpreted as network congestion, again depending on whether the number of packets in the queuing entity is between a minimum threshold and a maximum threshold, and are relayed even further.

Therefore, the above approach has one or more of the following drawbacks:

It is slow and inflexible:
Before starting the actual service, both terminals have to detect and confirm mutual ECN-capability.

It is vulnerable to ECN-incapability:
If there is only one ECN-incapable routing entity in the path of the end-to-end connection between the terminals, the ECN field will be ignored, and the corresponding data packet may be dropped depending on QoS considerations.

It is difficult to be implemented in existing networks:
Considering the fact the data packets in an end-to-end connection may be routed on substantially any arbitrary path from one routing entity to another, the entire network must be configured to ECN-capability to ensure full ECN-compliance.

It does not provide Qos granularity and/or congestion Granularity:
ECN-compliance only allows a basic determination between conforming/non-conforming with a QoS requirement and between congested/not congested of the at least one routing entity.

SUMMARY

In consideration of the above, it is an object of the present invention to provide a method, a network element and modules therefore, and a computer program for use in prioritizing a plurality of queuing entities.

The present invention is concentrated on the User Plane part of QoS enforcement, without being restricted thereto.

According to the present invention, in a first aspect, this object is for example achieved by a method comprising:

prioritizing a plurality of queuing entities with respect to each other;

receiving a data stream consisting of a plurality of data packets;

marking each of the plurality of data packets with one out of a plurality of identifiers based on a predetermined requirement, the plurality of identifiers corresponding to the plurality of queuing entities;

enforcing each one of the plurality of data packets based on the respective identifier, comprising:
  detecting the identifier in each one of the plurality of marked data packets; and
  queuing, responsive to the detecting, the data packets into one of the plurality of prioritized queuing entities;

scheduling, in each of the plurality of prioritized queuing entities, the respective queued data packets; and transmitting the scheduled data packets in each of the plurality of prioritized queuing entities according to the priority of the respective queuing entity.

According to advantageous further refinements of the invention as defined under the above first aspect, in the receiving, each one of the plurality of data packets comprises at least an information element, and the marking is performed in the respective information element;

at least the transmitting is based on Worldwide Interoperability for Microwave Access;

the marking comprises defining the predetermined requirement to be one of a predetermined Differentiated Services Codepoint and a predetermined data packet flow rate;

the marking and enforcing comprise defining the information element to consist of $\lceil \log_2(n) \rceil$ bits of the data packet header, where $\lceil \ \rceil$ represents an operator for the upper next integer, and the prioritizing and enforcing comprise defining the plurality of queuing entities to consist of n queuing entities, n being an integer greater than 1;

the marking comprises defining the information element to be at least a section of $\lceil \log_2(n) \rceil$ bits of the destination address of the data packet; the first aspect further comprising:
  mapping the section of $\lceil \log_2(n) \rceil$ bits of the destination address of the data packet to a section of $\lceil \log_2(n) \rceil$ bits of the source address of the data packet;
  the enforcing comprises defining the information element to be at least the section of $\lceil \log_2(n) \rceil$ bits of the source address of the data packet;

the marking and enforcing comprise defining the information element to consist of up to both bits of the Explicit Congestion Notification Field of the data packet header, and the prioritizing and enforcing comprise defining the plurality of queuing entities to consist of up to four queuing entities;

the scheduling is based on the Differentiated Services Codepoint of the data packet header.

According to the present invention, in a second aspect, this object is for example achieved by a module comprising:

a receiver configured to receive a data stream consisting of a plurality of data packets;

a marking entity configured to mark each of the plurality of data packets with one out of a plurality of identifiers based on a predetermined requirement, the plurality of identifiers corresponding to the plurality of queuing entities; and a sender configured to send the plurality of marked data packets.

According to advantageous further refinements of the invention as defined under the above second aspect, each one of the plurality of data packets received by the receiver comprises at least an information element, and wherein the marking entity is configured to mark in the respective information element;

the receiver is configured for Worldwide Interoperability for Microwave Access;

the predetermined requirement is one of a predetermined Differentiated Services Codepoint and a predetermined data packet flow rate;

the information element is configured to consist of $\lceil \log_2(n) \rceil$ bits of the data packet header, where $\lceil \ \rceil$ represents an operator for the upper next integer, and the plurality of queuing entities is configured to consist of n queuing entities, n being an integer greater than 1;

the information element is configured to consist of at least a section of $\lceil \log_2(n) \rceil$ bits of the destination address of the data packet;

the information element is configured to consist of up to both bits of the Explicit Congestion Notification Field of the data packet header, and the plurality of queuing entities is configured to consist of up to four queuing entities;

the module is chipset insertable.

According to the present invention, in a third aspect, this object is for example achieved by a module comprising:

a receiver configured to receive a data stream consisting of a plurality of data packets, each of the plurality of data packets being marked with an identifier;

an enforcement entity configured to enforce each one of the plurality of data packets based on the respective identifier, and to further comprise:

a detector configured to detect the identifier in each one of the plurality of marked data packets; and a plurality of queuing entities configured to be prioritized with respect to each other, and to queue, responsive to the detector, the data packets into one of the plurality of prioritized queuing entities;

a scheduler configured to schedule, in each of the plurality of prioritized queuing entities, the respective queued data packets; and a transmitter configured to transmit the scheduled data packets in each of the plurality of prioritized queuing entities according to the priority of the respective queuing entity.

According to advantageous further refinements of the invention as defined under the above third aspect, the transmitter is configured for Worldwide Interoperability for Microwave Access;

the identifier is configured to consist of $\lceil \log_2(n) \rceil$ bits of the data packet header, where $\lceil\ \rceil$ represents an operator for the upper next integer, and the plurality of queuing entities is configured to consist of n queuing entities, n being an integer greater than 1;

the identifier is configured to consist of at least a section of $\lceil \log_2(n) \rceil$ bits of the source address of the data packet;

the identifier is configured to consist of up to both bits of the Explicit Congestion Notification Field of the data packet header, and the plurality of queuing entities is configured to consist of up to four queuing entities;

the scheduler is configured to schedule based on the Differentiated Services Codepoint of the data packet header;

the module is chipset insertable.

According to the present invention, in a fourth aspect, this object is for example achieved by a network element comprising:

the module according to the above second aspect; and the module according to the above third aspect.

According to the present invention, in a fifth aspect, this object is for example achieved by a module comprising:

means for receiving a data stream consisting of a plurality of data packets;

means for marking each of the plurality of data packets with one out of a plurality of identifiers based on a predetermined requirement, the plurality of identifiers corresponding to the plurality of queuing entities; and means for sending the plurality of marked data packets.

According to the present invention, in a sixth aspect, this object is for example achieved by a module comprising:

means for receiving a data stream consisting of a plurality of data packets, each of the plurality of data packets being marked with an identifier;

means for enforcing each one of the plurality of data packets based on the respective identifier, further comprising:

means for detecting the identifier in each one of the plurality of marked data packets; and a plurality of means for queuing to be prioritized with respect to each other, and for queuing, responsive to the means for detecting, the data packets into one of the plurality of prioritized means for queuing;

means for scheduling, in each of the plurality of prioritized means for queuing, the respective queued data packets; and means for transmitting the scheduled data packets in each of the plurality of prioritized means for queuing according to the priority of the respective means for queuing.

According to the present invention, in a seventh aspect, this object is for example achieved by a network element comprising:

the means for constituting the module according to the above fifth aspect; and the means for constituting the module according to the above sixth aspect.

According to the present invention, in an eighth aspect, this object is for example achieved by a computer program comprising:

prioritizing a plurality of queuing entities with respect to each other;

receiving a data stream consisting of a plurality of data packets;

marking each of the plurality of data packets with one out of a plurality of identifiers based on a predetermined requirement, the plurality of identifiers corresponding to the plurality of queuing entities;

enforcing each one of the plurality of data packets based on the respective identifier, comprising:

detecting the identifier in each one of the plurality of marked data packets; and queuing, responsive to the detecting, the data packets into one of the plurality of prioritized queuing entities;

scheduling, in each of the plurality of prioritized queuing entities, the respective queued data packets; and transmitting the scheduled data packets in each of the plurality of prioritized queuing entities according to the priority of the respective queuing entity.

According to advantageous further refinements of the invention as defined under the above eighth aspect, the computer program is directly loadable into an internal memory of a network element.

In this connection, it has to be pointed out that advantageously the present invention enables:

a more flexible QoS enforcement, as the marking entity and the enforcement entity can be placed substantially arbitrarily in the path between the terminals, and no compliance is required for the routing entities in the network.

provision of the best possible service when network resources are available, since the plurality of prioritized queuing entities enables service and/or congestion granularity differentiating between multiple classes of network traffic and/or congestion, which advantage is explained in more detail at the end of the description.

Improvement of user experience, since high priority traffic classes are relayed instantaneously (resulting e.g. in improved VoIP speech quality) and low priority traffic classes are enabled to efficiently exploit the remaining network resources (resulting e.g. in a data download becoming slow instead of being cancelled before completion). This advantage is also explained in more detail at the end of the description.

BRIEF DESCRIPTION OF THE DRAWINGS

Aspects of the present invention are described herein below with reference to the accompanying drawings, in which.

DETAILED DESCRIPTION OF ASPECTS OF THE PRESENT INVENTION

Aspects of the present invention are described herein below by way of example with reference to the accompanying drawings.

For the purpose of the present invention to be described herein below, it should also be noted that

- a marking entity may for example be any device, unit or means by which a data packet may be marked with a retrievable identifier;
- an identifier may be any retrievable information element preferably in a data packet header, which may be incorporated in the data packet (header) e.g. in a consecutive or distributed fashion, as well as being incorporated e.g. by direct bit-by-bit setting or by applying e.g. a pseudo noise sequence to assigned bit positions. In a particular example, to which the invention is not to be restricted to, the marking is performed in the ECN (Explicit Congestion Notification) field consisting of bit #6 and bit #7 of the data packet header's IPv4 ToS field or the IPv6 Traffic Class field, respectively, as will be described in detail later;
- an enforcement entity may be any device, unit or means that is capable of enforcing, i.e. handling with priority, one type of data packets over another;
- a queuing entity may be any device, unit, or means being arranged to align data packets in e.g. a work space, and may comprise functionalities for a prescribed alignment, like e.g. FIFO (first in-first out) or LIFO (last in-first out). In a particular example, to which the invention is not to be restricted to, the prescribed alignment is carried out in accordance with the DSCP consisting of bit #0 to bit #5 of the data packet header's IPv4 ToS field or the IPv6 Traffic Class field, respectively.

Figure 4A:
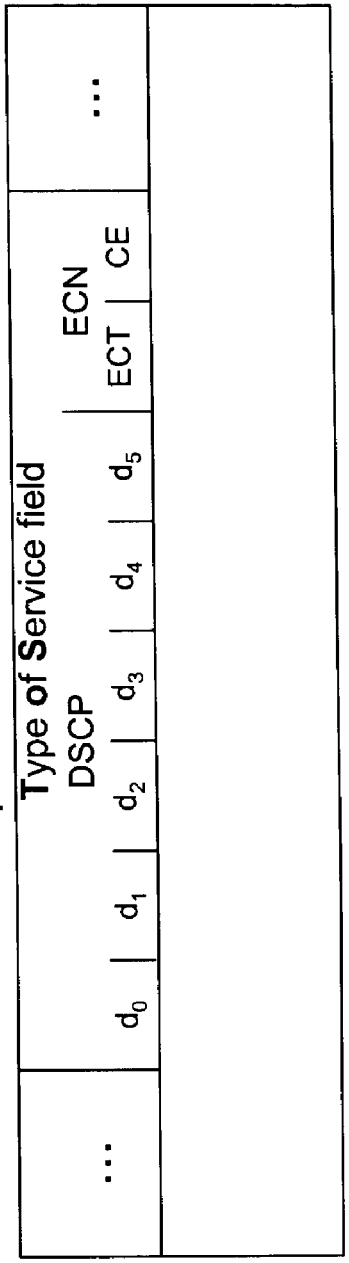
FIG. 4A shows an example data packet structure according to IPv4.
Figure 4B:
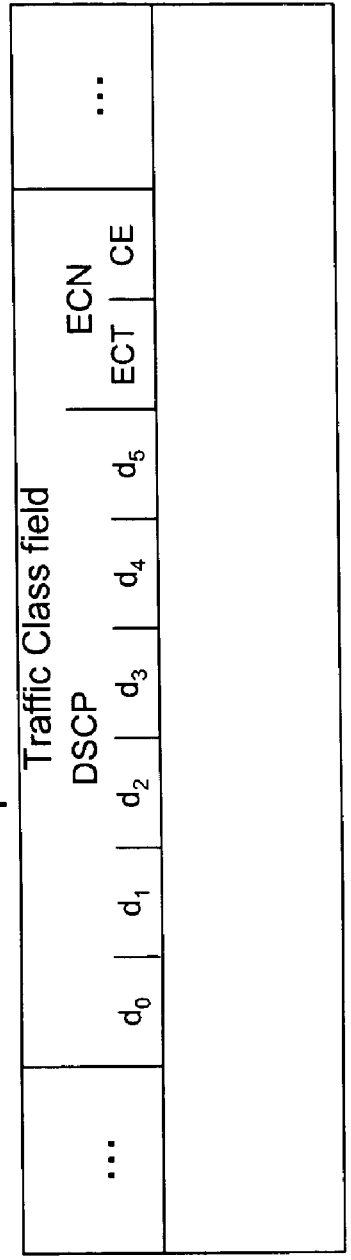
FIG. 4B shows an example data packet structure according to IPv6.

As an example structure for data packets for use in the present invention, FIGS. 4A and 4B show the structure of data packets according to IPv4 and IPv6, respectively.

For descriptive purposes, e.g. the above-mentioned Pool 1 is used as described herein below. The IPv4/IPv6 data packet header comprises a Differentiated Services Codepoint (DSCP) field consisting of a bit set DSCP=$\{d_0, d_1, d_2, d_3, d_4, d_5\}$ (or $d_0d_1d_2d_3d_4d_5$ in short) and an Explicit Congestion Notification (ECN) field consisting of a bit set ECN=$\{ECT, CE\}$ or ECT, CE in short. Together, the DSCP field and the ECN field constitute the IPv4 ToS field or the IPv6 Traffic Class field, respectively. In the following description, the DSCP field or the source/destination address pair is used for QoS thresholding, while the ECN field is used for marking. As mentioned above, this selection serves only for ease of the description, and is neither restrictive nor exclusive for the present invention.

For descriptive purposes of the present invention, to which the present invention is not to be restricted to, only the above-described Pool 1 is used in this description, in which CS0 (Class Selector) stands for the DSCP bit set {0,0,0,0,0} or 00000 in short, and defines the above-mentioned lowest default QoS priority for the BE traffic class. Class selectors CS1 (DSCP=001000) to CS7 (DSPC=111000) define the subsequent QoS priorities. In addition, DSCP values AF11 (Assured Forwarding, DSCP=001010) to AF43 (DSCP=100110) define the next QoS priorities subsequently higher than the class selectors CS0 to CS7. Finally, the DSCP value 101110 constitutes the EF PHB (Expedited Forwarding PHB) class for a so-called premium forwarding for data packet streams e.g. associated with an emergency VoIP end-to-end connection.

Figure 5:
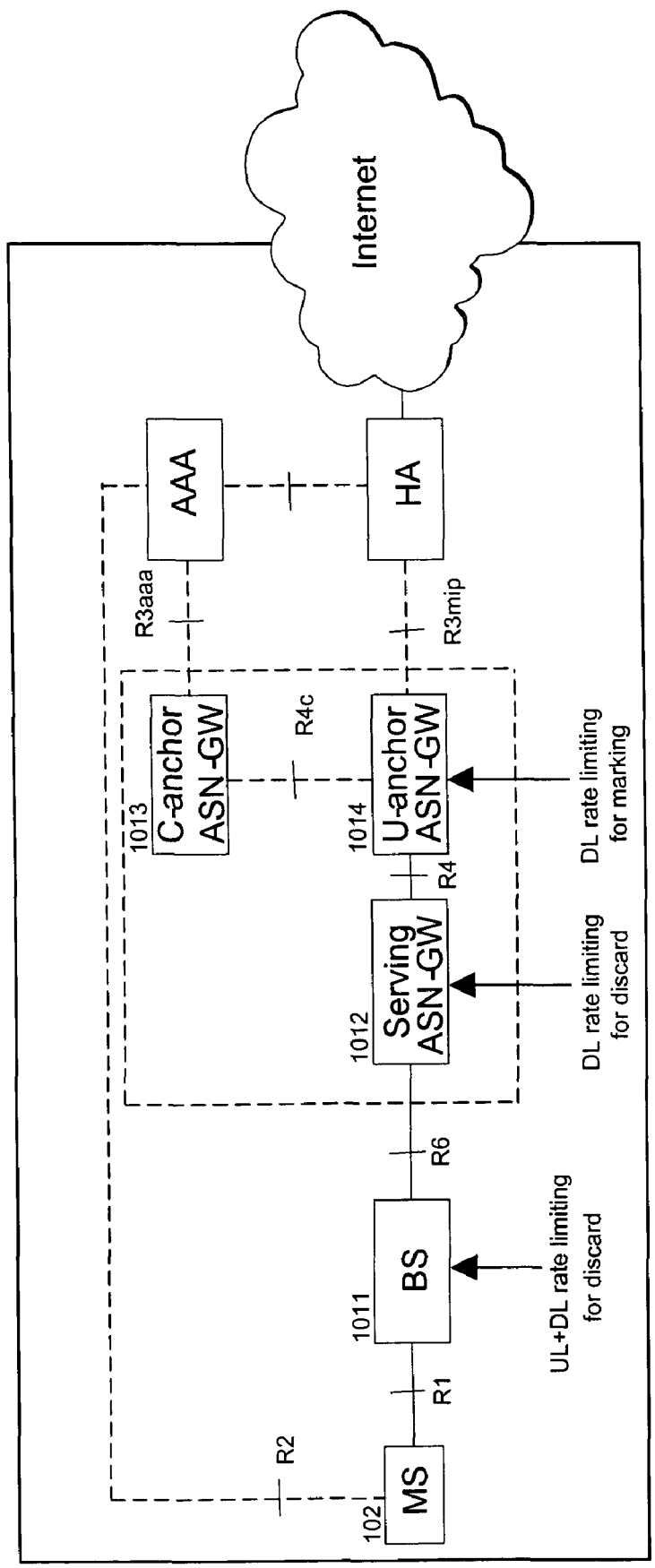
FIG. 5 shows the section of the communication network for Loose and Distributed QoS enforcement according to the present invention.

FIG. 5 shows the section of the communication network 100 in which Loose and Distributed QoS enforcement according to the present invention may be performed.

According to FIG. 5, a QoS marking entity according to the invention is shown in the U-anchor ASN-GW 1014. However, the same concept would apply when such marking would be performed e.g. in the HA or other entities in the network 103 of the NSP or the network element 101. Details concerning the marking entity according to the present invention are set out herein below in conjunction with FIG. 7.

An enforcement entity according to the invention is shown in the Serving ASN-GW 1012. Also in case of the enforcement entity, the same concept would apply when such an enforcement would be performed e.g. in other entities in the network 103 of the NSP or the network element 101. Details concerning the enforcement entity according to the present invention are set out herein below in conjunction with FIG. 8.

Figure 6:
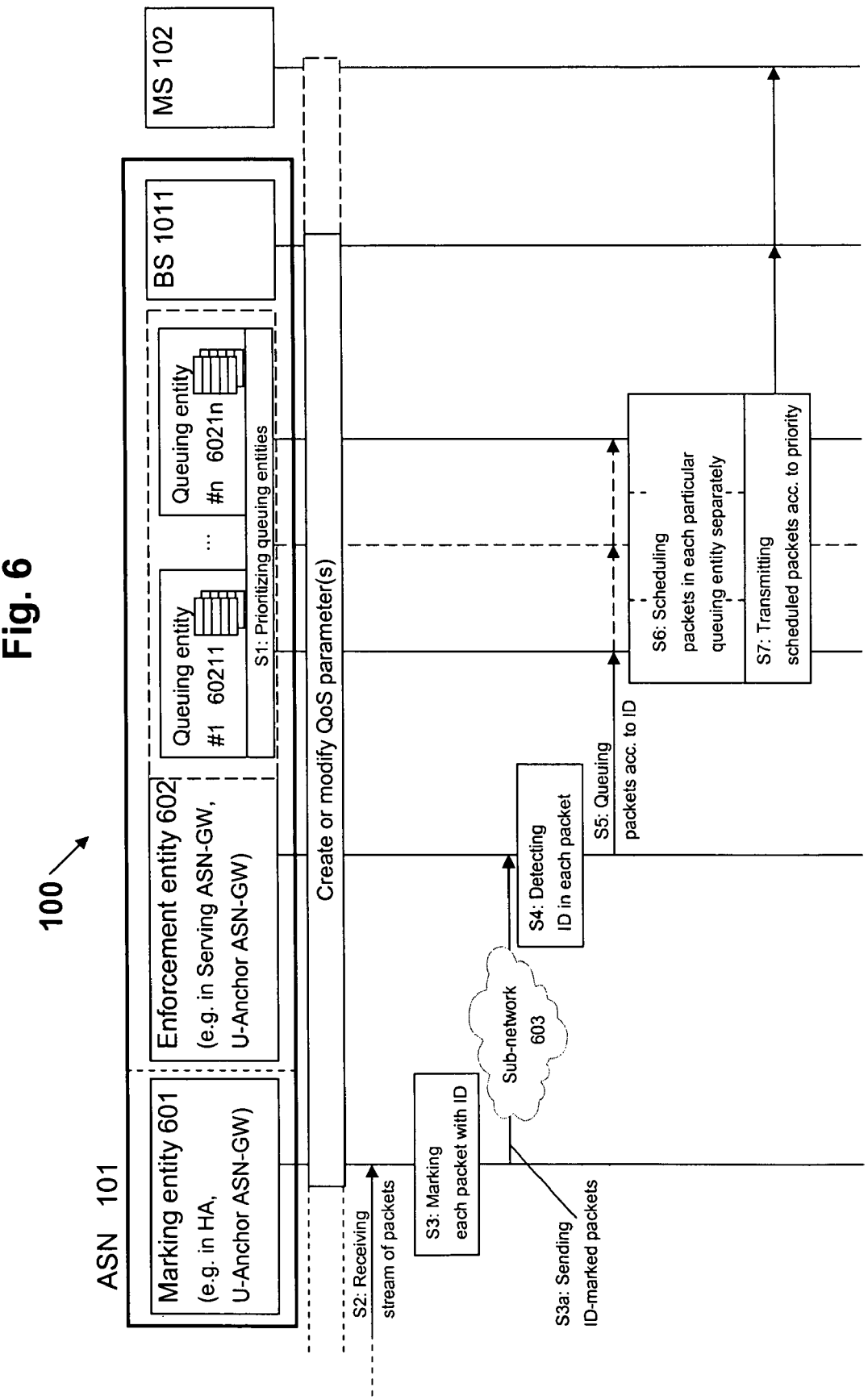
FIG. 6 shows a method for Loose and Distributed QoS enforcement according to the present invention.

FIG. 6 shows a method for Loose and Distributed QoS enforcement according to the present invention. Signalling between elements is indicated in horizontal direction, while time aspects between signalling are reflected in the vertical arrangement of the signalling sequence as well as in the sequence numbers.

Referring back to FIG. 1, the communication network 100 comprises the network element ASN 101 and the terminal MS 102. The network element ASN 101 in turn comprises the access entity BS 1011. As shown in FIG. 6, the network element ASN 101 further comprises a marking entity 601 according to the invention, the detailed structure of which is described herein below with reference to FIG. 7, and an enforcement entity 602 according to the invention, the detailed structure of which is described herein below with reference to FIG. 8.

Additionally, a sub network 603 comprising e.g. at least one routing entity and being e.g. a section of the communication network 100 may be arranged between the marking entity 601 and the enforcement entity 602. It is to be noted that the marking entity 601 and the enforcement entity 602 may also be arranged in different network elements (as indicated by the broken line between the marking and enforcement entities), in which case the sub network 602 may be used for data packet relaying between the marking entity 601 and the enforcement entity 602.

Furthermore, the enforcement entity 602 comprises or has access to a plurality of queuing entities #1 60211 to #n 6021n, n being a positive integer greater than 1. It is to be noted that a number of or the whole plurality of n queuing entities may also be comprised in or accessible by the network element ASN 101 instead of being comprised in the enforcement entity 602, as indicated by the broken line extension of the functional block for the enforcement entity, as long as it is ensured that the enforcement entity 602 is configured to have access to the n queuing entities directly or at least indirectly.

For reasons of simplicity, only the option of the n queuing entities being comprised in the enforcement entity 602 is described herein below, to which descriptive simplification the invention is not to be restricted to.

Figure 1:
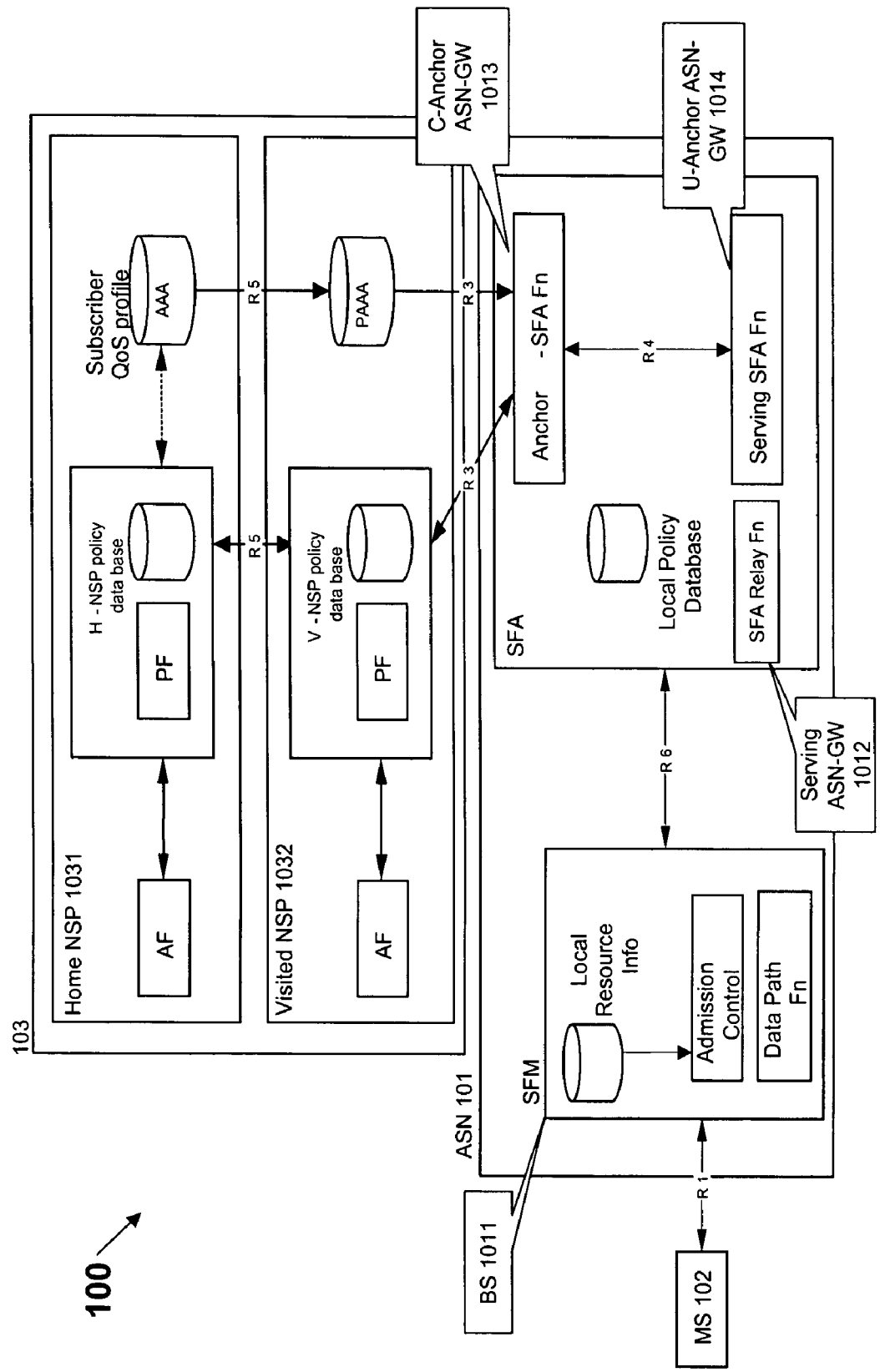
FIG. 1 shows the communication network according to the WiMAX Forum QoS Architecture.
Figure 2:
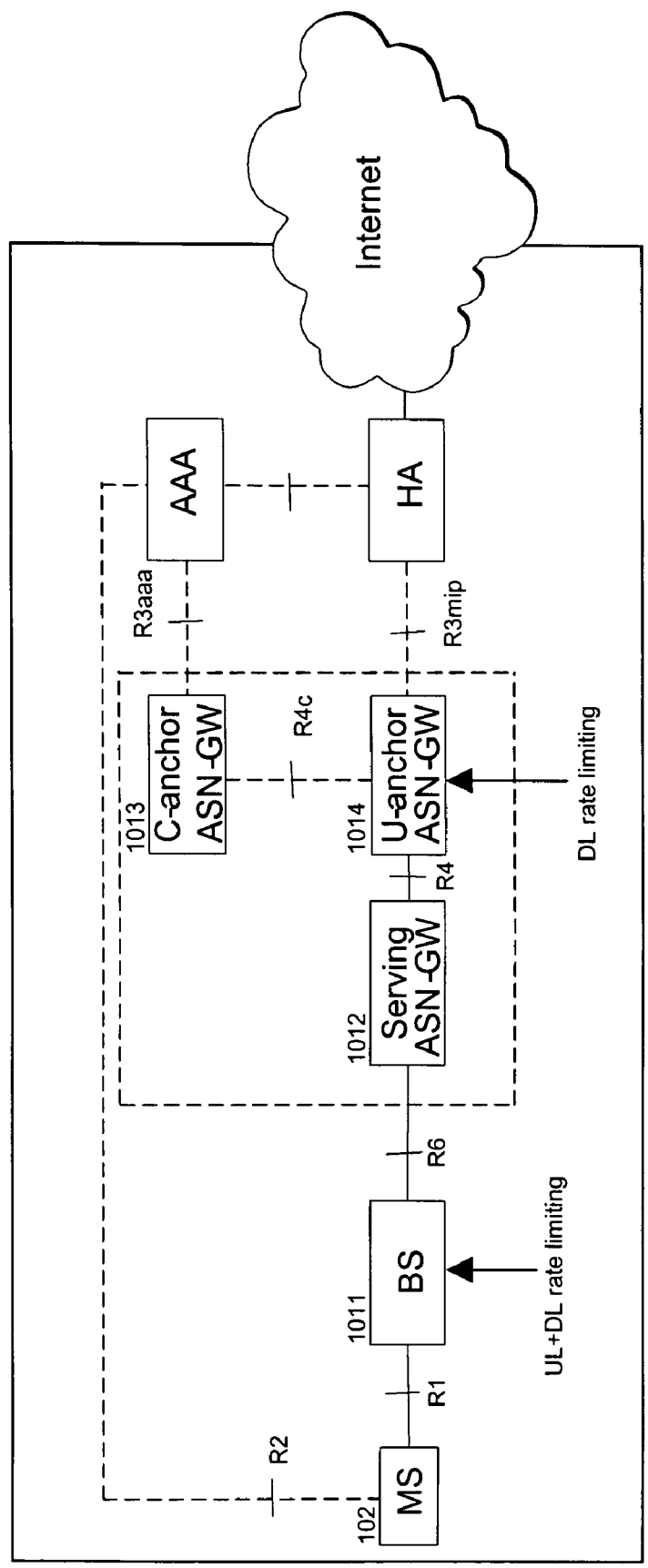
FIG. 2 shows a section of the communication network for QoS Enforcement in the U-anchor ASN-GW.
Figure 3:
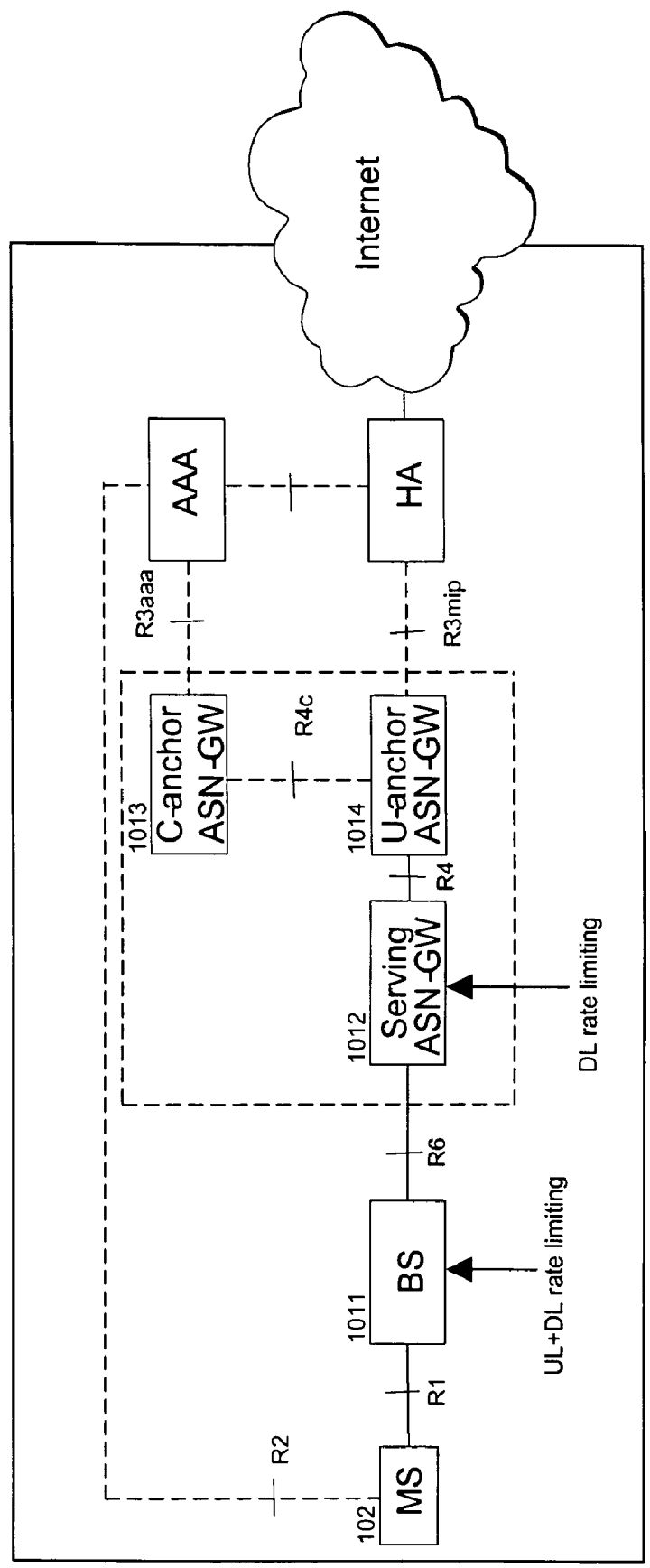
FIG. 3 shows the section of the communication network for QoS Enforcement in the Serving ASN-GW.

As an optional preparatory measure, the QoS parameters for the network element may be created or modified based e.g. on the Local Policy Database in or accessible to the gateway entity 1012, 1014 and the Local Resource Information in or accessible to the access entity 1011, as shown in FIG. 1. Alternatively, as indicated by the broken line extensions of the preparatory measure functional block, also the Subscriber QoS profile of the terminal MS 102 from an AAA entity via, if necessary, a PAAA entity of the Visited NSP 1032 may be taken into account in creating or modifying the QoS parameters.

In step S1, each of the n queuing entities is prioritized with respect to the other queuing entities, so as to define an order of priority for handling a case in which e.g. at least two queuing entities each attempt to send at least one data packet simultaneously or substantially simultaneously.

In step S2, the marking entity is configured to receive a data stream consisting of a plurality of data packets from a data packet information source (not shown). The data packet information source may be for example the Internet, another terminal or an experimental data packet source generating e.g. test data packets.

In step S3, in the marking entity, each particular one of the data packets is marked with an identifier ID.

As described in detail with reference to FIG. 7 herein below, the marking may be performed e.g. based on (multiple) thresholding of the DSCP field of the data packet header against e.g. n-1 DSCP thresholds e.g. based on the signed QoS level of the end user, and the data packets are marked e.g. in the ECN field of the data packet header with one out of n identifiers. Alternatively, the data packets may also be marked in at least a section of e.g. the destination address of the data packet. The n identifiers correspond to the n queuing entities.

Alternatively, the marking may also be performed e.g. based on n-1 data packet flow rates provisioned e.g. by the subscriber profile. Also this option is described in further detail herein below.

In the subsequent step S3a, the ID-marked data packets are sent or relayed e.g. via the sub network 603 from the marking entity 601 to the enforcement entity 602.

In step S4, in the enforcement entity 602, the identifier ID in each data packet is detected, as described in detail herein below with reference to FIG. 8.

In step S5, the data packets are queued in a particular one of the plurality of n queuing entities designated by the determined identifier ID, as described in detail herein below with reference to FIG. 8.

In step S6, in each particular one of the plurality of n queuing entities separately, the respective queued data packets are scheduled according to at least one of the predetermined QoS parameters, e.g. at least one DSCP threshold, as described in detail herein below with reference to FIG. 8.

In step S7, the separately scheduled data packets are transmitted to the terminal MS 102 according to the priorities of the n queuing entities e.g. via the access entity 1011.

In other words, in the simplest case of n=2 queuing entities, the method proposes to queue all data packets based on DSCP COS (Class of Service) (as regular QoS enforcement point), but with addition of two queuing entities—one for conforming data packets and another identical for non-conforming data packets. In such a scenario, a 2-level scheduling for data packet processing is implemented—one based e.g. on the DSCP, another one according to e.g. strict priority where high priority is being enforced for conforming data packets.

Figure 7:
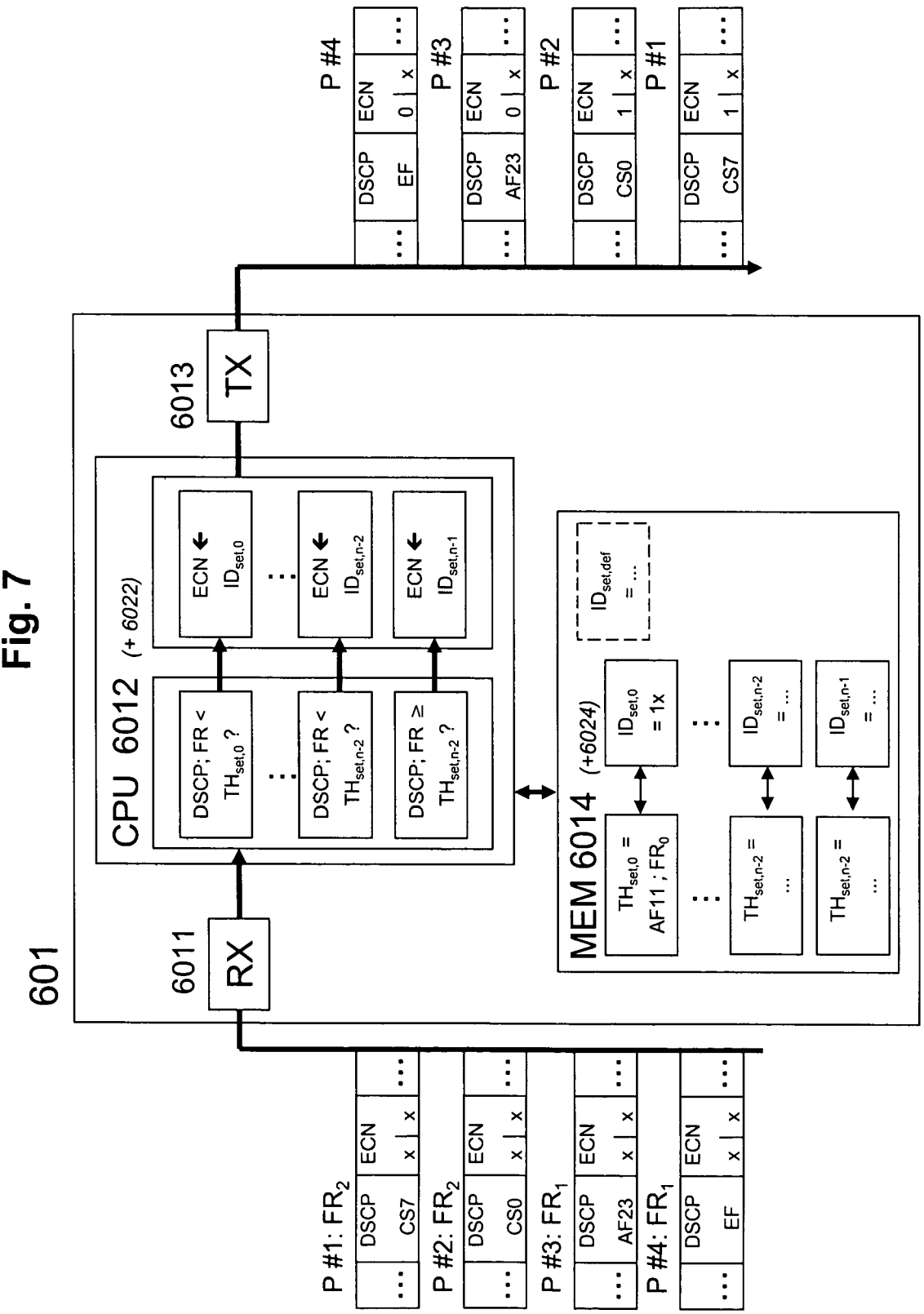
FIG. 7 shows a marking entity or module according to the present invention.

FIG. 7 shows the marking entity or module 601 according to the present invention. As shown in FIG. 7, the marking entity comprises a receiver RX 6011 for receiving data packets, a CPU (central processing unit) 6012, a sender TX 6013 for sending data packets and a memory MEM 6014. Optionally, the memory MEM 6014 may constitute a shared memory (6014 (+6024)) with a memory MEM 6024 of the enforcement entity 602. Also optionally, the CPU 6012 may constitute a shared CPU (6012 (+6022)) with a CPU 6022 of the enforcement entity 602.

It is to be noted that the reference signs DSCP and ECN stated herein below are not to be restricted to bits #1 to #5, and bits #5, #6 of the IPv4 ToS/IPv6 Traffic class field, but may consist of as many bits as are required for the (multiple) thresholding to be described next.

The memory MEM 6014 is configured to store or hold e.g. correspondences between at least one threshold $TH_{set,n-2}$ or at least one pre-provisioned or predetermined flow rate $TH_{set,n-2}$ and at least two associated identifiers $ID_{set,0}$ to $ID_{set,n-1}$. Up to n such correspondences may be stored or held in the memory MEM 6014 corresponding to the n queuing entities. In addition, a default identifier $ID_{set,def}$ may be stored or hold for identifying e.g. an unknown DSCP or unknown flow rate FR. Preferably, the identifiers consist of up to $\lceil \log_2(n) \rceil$ bits (where $\lceil \ \rceil$ represents an operator for the upper next integer), thus enabling identification of up to n queuing entities. The identifier may have a bit length equal to e.g. at least a section of up to $\lceil \log_2(n) \rceil$ bits of e.g. the destination address of the data packet. In the special case of each identifier having 2 bits, up to $n=2^2=4$ queuing entities may be identified. In the simplest case, only 1 bit is required for the identifier to identify $n=2^1=2$ queuing entities.

The CPU 6012 is configured e.g. to carry out (multiple) thresholding of the (respective) DSCP in the data packets received by the receiver 6011, or e.g. to carry out (multiple) thresholding of the flow rate FR of the data packets received by the receiver RX 6011, both against e.g. n-1 thresholds $TH_{set,0}$ to $TH_{set,n-2}$ in order to classify the DSCP or the flow rate FR of the received data packet(s) to belong to one traffic class m out of n traffic classes defined by the n-1 thresholds $TH_{set}$. In the special case of the ECN field having 2 bits, $2^2-1=3$ thresholds $TH_{set,0}$ to $TH_{set,2}$ may be used to define 4 intervals for classifying 4 queuing entities for 4 traffic classes. In the simplest case of 1 bit, 1 threshold $TH_{set,0}$ classifies 2 classes into 2 queuing entities, e.g. for data packets conforming to the one threshold $TH_{set,0}$ and non-conforming data packets, or e.g. for data packets above a predetermined flow rate $FR_0$ and data packets below $FR_0$.

After having classified the received data packet(s) in the above manner, the CPU 6012 is configured to mark the data packet(s) with an identifier $ID_{set,m}$ associated with the traffic class m classified by the above (multiple) thresholding, where $m \in 0, \ldots, n$.

In case the DSCP or flow rate of a data packet cannot be recognized or measured for some reason, this data packet can e.g. be marked with an optional identifier $ID_{set,def}$ associated with a default traffic class.

For illustrative purposes, an example for DSCPs is given, in which a stream of 4 data packets P#1 to P#4 arrive in the order from P#1 to P#4 at the receiver RX 6011 to be classified into two queuing entities. Data packet #1 has a DSCP=CS7 (111000), data packet #2 has a DSCP=CS0 (000000, default PHB), data packet #3 has a DSCP=AF23 (010110) and data packet #4 has a DSCP=EF (101110, premium PHB). All data packets #1 to #4 have an undefined ECN=xx, where $x \in \{0,1\}$. One threshold $TH_{set,0}$=AF11 (001010) is set in the memory MEM 6014, thus defining 2 traffic classes, one for data packets conforming with the DSCP threshold and one for non-conforming data packets.

As an alternative to the above DSCPs, an example for flow rates is given, in which data packets P#1 to P#4 may e.g. arrive in the reverse order (not shown) from P#4 to P#1. In that case, data packets #4 and #3 may e.g. define a flow rate $FR_1$.

The additionally arriving data packets #2 and #1 may e.g. increase the flow rate $FR_1$ to a flow rate $FR_2$. As above, all data packets #1 to #4 have an undefined ECN=xx. One threshold $TH_{set,0}=FR_0$ is set in the memory MEM 6014, thus defining 2 traffic classes, one for data packets above the flow rate threshold $FR_0$ and one for data packets below the flow rate threshold $FR_0$.

Following the above example for DSCPs, data packet #1 having the DSCP=CS7 is detected to have a DSCP below the DSCP threshold $DSCP_{set,0}=AF11$, when being processed by the CPU 6012, and therefore is classified into the traffic class for non-conforming data packets. Therefore, data packet #1 is marked e.g. in the ECN field with the preset identifier $ID_{set,0}=1x$, and is sent by the sender TX 6013. Data packet #2 having DSCP=CS0 is also detected to have a DSCP below the DSCP threshold=AF11, i.e. is classified into the traffic class for non-conforming data packets, hence it is also marked e.g. in its ECN field with 1x and is sent by the sender TX 6013. In the same manner, data packets #3 and #4 having DSCPs of AF23 and EF, respectively, are detected to have DSCPs above the DSCP threshold, are classified into the traffic class for conforming data packets, and therefore are marked e.g. in the ECN field with another identifier, e.g. $ID_{set,1}=0x$.

Following the above example for flow rates, it is assumed that data packets #4 to #1 arrive in a single data packet burst. In that case, e.g. the receiver RX 6011 may be configured with a queuing entity (not shown) in order to queue data packets #4 to #1 prior to processing the data packets #4 to #1 by the CPU 6012. When being processed by the CPU 6012, data packets #4 and #3 are detected to have a flow rate $FR_1$ below the flow rate threshold=$FR_0$. Therefore, data packets #4 and #3 are marked e.g. in the ECN field with the preset identifier $ID_{set,0}=0x$, and are sent by the sender TX 6013. Data packets #2 and #1 are detected to have the flow rate $FR_2$ above the flow rate threshold $FR_0$. Therefore, data packets #2 and #1 are marked e.g. in the ECN field with the preset identifier $ID_{set,0}=1x$, and are also sent by the sender TX 6013.

Alternatively, as mentioned above, the marking may also be effected in at least a section of $\lceil \log_2(n) \rceil$ bits of e.g. the destination address of the data packet.

Accordingly, data packets #1 to #4 being marked e.g. in their respective ECN fields or destination addresses and being classified into one of the two traffic classes are sent from the marking entity 601 via the sender TX 6013 e.g. in the same order in which the data packets #1 to #4 have been received. The sending by the sender TX 6013 may be performed via the sub-network 603.

As a design option, the marking module may be chipset insertable e.g. into the network element.

Figure 8:
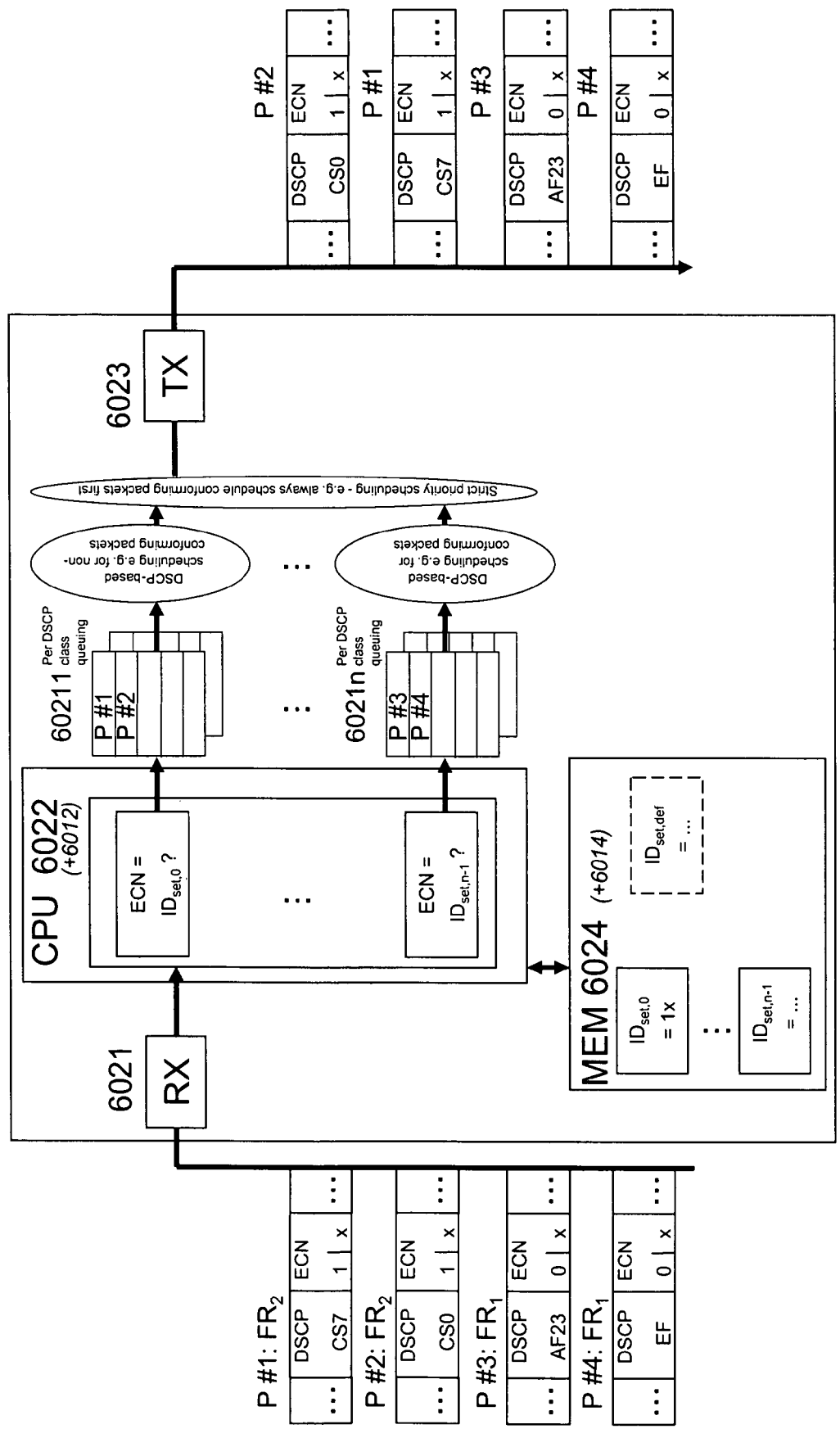
FIG. 8 shows an enforcement entity or module according to the present invention.

FIG. 8 shows a module or enforcement entity according to the present invention. As shown in FIG. 8, the enforcement entity comprises a receiver RX 6021 for receiving marked data packets, a CPU 6022, a plurality of n queuing entities 60211 to 6021n, a transmitter TX 6023 for sending data packets and a memory MEM 6024. As mentioned above, the memory MEM 6024 may optionally constitute the shared memory (6024 (+6014)) with the memory MEM 6014 of the marking entity 601, and optionally, the CPU 6022 may constitute the shared CPU (6022 (+6012)) with the CPU 6012 of the marking entity 601.

It is pointed out again that the reference signs DSCP and ECN stated herein below are not to be restricted to bits #1 to #5, and bits #5, #6 of the IPv4 ToS/IPv6 Traffic class field, but may consist of as many bits as are required e.g. for the (multiple) thresholding.

As described above, the plurality of queuing entities 60211 to 6021n may be configured so as to be prioritized with respect to each other.

The memory MEM 6024 is configured to store or hold e.g. at least two identifiers $ID_{set}$ classifying at least two traffic classes. Up to n such identifiers $ID_{set}$ may be stored or held in the memory MEM 6024 corresponding to the n queuing entities. Additionally, a default identifier may be stored or held for identifying a default traffic class (e.g. for data packets with an unknown DSCP or unknown flow rate FR). As mentioned above, the identifiers consist of up to $\lceil \log_2(n) \rceil$ bits, thus enabling identification of up to n queuing entities. The identifier may have a bit length equal to e.g. at least a section of up to $\lceil \log_2(n) \rceil$ bits of the source address of the data packet as received via the receiver RX 6021, which source address may be identical with the destination address described above. In the special case of the ECN field having 2 bits, up to $n=2^2=4$ queuing entities may be identified. In the simplest case, only 1 bit is required for the identifier to identify $n=2^1=2$ queuing entities.

Preferably, the memory MEM 6024 is configured to store or hold a set of identifiers $ID_{set,0}$ to $ID_{set,n-1}$, $ID_{set,def}$ identical to set of identifiers stored or held by the memory MEM 6014 of the above-described marking entity. For this reason, the memories MEM 6014 of the marking entity 601 and MEM 6024 of the enforcement entity 602 may exchange information on the stored or held set of identifiers. Alternatively, as described above, the memories MEM 6014 and MEM 6024 may be configured to constitute the shared memory 6014(+6024); 6024(+6014), e.g. in case the marking entity 601 and the enforcement entity 602 are located in the same network element. Furthermore, also the CPU 6012 of the marking entity 601 and the CPU 6022 of the enforcement entity 602 may be configured to constitute the shared CPU 6012(+6022); 6022(+6012), e.g. in case the marking entity 601 and the enforcement entity 602 are located in the same network element.

It is to be noted that in case the identifier is to be detected e.g. in the source address or another section of up to $\lceil \log_2(n) \rceil$ bits e.g. of the header of a respective data packet, it is possible that the identifiers $ID_{set}$ stored or held in the memory MEM 6024 of the enforcement entity 602 consist e.g. of a set of n source addresses classifying the n traffic classes (or n queuing entities, respectively). This set of identifiers stored or held in the memory MEM 6024 of the enforcement entity 602 is preferably identical with or mapped from a set $ID_{set}$ of corresponding destination addresses stored or held in the memory MEM 6012 of the marking entity 601. In that case, the marking entity 601 may have sent the respective data packet to a destination address m corresponding to the identified traffic class m. There are e.g. the following options for identifying the traffic class m by the enforcement entity 602:

1. The data packet sent to the destination address m may be received directly by the receiver RX 6021 of the enforcement entity 602, in which case the enforcement entity may be configured to provide e.g. a multi-port functionality e.g. by providing an address range of n addresses.
2. Alternatively, the communication network 100 may for example comprise n routing entities each providing e.g. a unique destination address and the address of the enforcement entity 602 as destination address. The respective data packet sent to the routing entity m (directly or via at least one other routing entity) corresponding to the identified traffic class m is provided in the data packet header with the destination address of the enforcement entity 602. The enforcement entity 602 receiving this data packet via the receiver RX 6021 is enabled to classify the data packet to be associated with the traffic class m by detecting the identifier, which identifier in this case corresponds to the source address of the data packet, which source address is in turn the address of the routing entity m.

3. Alternatively, a combination of the above two options may be applied. Assume $\{n_1, n_2\}=n$, i.e. the set of n destination addresses consist of two subsets $n_1$ and $n_2$. Hence, the multi-port functionality may be configured to provide $n_1$ destination addresses in its address range, and $n_2$ routing entities may be provided.

The CPU 6022 is configured to carry out detection of the (respective) identifier(s) of the data packet(s) received by the receiver RX 6021 in order to classify the received data packet (s) to belong to one traffic class m out of n traffic classes. As mentioned above, in the special case of the identifier having 2 bits, 4 identifiers may be defined for classifying 4 queuing entities for 4 traffic classes. In the simplest case of each identifier having 1 bit, 2 identifiers may be defined, e.g. for data packets conforming to the one DSCP threshold $DSCP_{set,0}$ and non-conforming data packets, for 2 queuing entities.

Furthermore, after the above-described detection of the identifier $ID_{set}$ of the data packet, the CPU 6022 is configured to queue the data packet in the queuing entity m identified by the detection.

In case already at least one data packet has been queued in a queuing entity, each queuing entity may be configured to perform scheduling of the queued data packets e.g. according to the QoS requirement stated in the DSCP field.

In addition, as described above, each queuing entity attempts to send the (scheduled) data packets, wherein an order of priority among the plurality of queuing entities may be applied.

It is to be noted that the above-described operations of scheduling data packets in each respective queuing entity and of transmitting the data packets according to the order of priority may be performed simultaneously or substantially simultaneously.

For illustrative purposes, as shown in FIG. 8, the above-given examples for DSCPs and flow rates given for data packets #1 to #4 and #4 to #1, respectively, are resumed, in which the stream of 4 marked data packets P#1 to P#4 has been sent by the sender TX 6013 of the marking entity 601. For reasons of descriptive simplicity, only the data packet order from #1 to #4 is described herein below, since the data packet order of arrival does not necessarily affect the processing principle of the enforcement entity 602. Data packets #1 and #2 have DSCPs CS7 and CS0, respectively, or flow rate $FR_2$, and each have been marked with the identifier 1x, while data packets #3 and #4 have DSCPs AF23 and EF, respectively, or flow rate $FR_1$, and each have been marked with the identifier 0x. Hence, 2 traffic classes for conforming and non-conforming data packets (or below and above the predetermined flow rate pFR) have been defined, and a first queuing entity (60211 in FIG. 8) has been associated with the conforming/below pFR data packet class, while a second queuing entity (6021n in FIG. 8) has been associated with the non-conforming/above pFR data packet class. As order of priority, the first queuing entity has a higher priority than the second queuing entity.

The respective identifier may e.g. be contained in the ECN field (as shown in FIG. 8) or at least a section of up to $\lceil \log_2(n) \rceil$ bits of the source address of the data packet.

After reception of the 4 data packets, the identifier of each particular data packet is detected. Data packet #1 is detected to have an identifier belonging to the traffic class for non-conforming/above pFR data packets, and thus data packet #1 is queued in the first queuing entity 60211. The same process is conducted for data packet #2, which is also queued in the first queuing entity 60211. At this point, it is assumed that for some reason, data packets #1 and #2 are queued in the first queuing entity instead of being relayed immediately.

Within the first queuing entity 60211, data packets #1 and #2 are scheduled according to their respective QoS requirements, e.g. the DSCPs. Since data packet #1 has a DSCP=CS7 (111000), which may be rated higher than data packet #2's DSCP=CS0 (000000), data packet #1 is scheduled to be sent before data packet #2.

Data packet #3 is detected to have an identifier belonging to the traffic class for conforming/below pFR data packets, and thus data packet #1 is queued in the second queuing entity 6021n. The same process is conducted for data packet #4, which is also queued in the second queuing entity 6021n. At this point, it is also assumed that for some reason, data packets #3 and #4 are queued in the second queuing entity instead of being relayed immediately.

Also within the second queuing entity 6021n, data packets #3 and #4 are scheduled according to their respective QoS requirements, e.g. the DSCPs. Since data packet #3 has a DSCP=AF23 (010110), which may be rated lower than data packet #4's DSCP=EF (101110), data packet #4 is scheduled to be sent before data packet #3.

Afterwards, assuming that both the first and second queuing entities attempt to send their respective queued scheduled data packets simultaneously or substantially simultaneously (e.g. in data packet bursts), the first queuing entity is enabled to send its data packets before the second queuing entity is enabled to do so, according to the order of priority. That is, data packets #4 and #3 are enabled to be sent before data packets #1 and #2.

As a result of the DSCP example, as shown in FIG. 8, the scheduled and priority-processed data packets #1 to #4 are sent in the following order: P#4, P#3, P#1, P#2. As a result of the flow rate example, data packets #4 to #1 are also sent the order: P#4, P#3, P#1, P#2.

As a design option, the enforcement module may be chipset insertable e.g. into the network element.

As described above, the present invention is particularly advantageous concerning service granularity and/or congestion granularity. In the following, a survey is given for both advantages. For the ease of explanation, an exemplary implementation of the present invention is chosen in the following, in which n=4 queuing entities are assigned to 4 traffic classes named e.g. emergency forwarding class, assured forwarding class, selector class and default BE class. Hence, the identifiers must consist of at least 2 bits. The 3 thresholds $TH_{set,0}$ to $TH_{set,2}$ could e.g. be $TH_{set,0}$=CS0 (000000), $TH_{set,1}$=CS7 (111000) and $TH_{set,2}$=AF43 (100110). For thresholding, it is assumed that a given DSCP has to be real greater than a DSCP threshold in order to be judged to be above the DSCP threshold. For example, a data packet with DSCP=CS7 would be judged to be below $TH_{set,1}$=CS7, would be marked with the corresponding identifier, and would be queued in the queue associated with the selector class, while a data packet with DSCP=AF11 would be identified to belong to the assured forwarding class. As an alternative, the 3 thresholds $TH_{set,0}$ to $TH_{set,2}$ could also be e.g. different flow rates.

Service Granularity:

Following the above example with n=4, a user of a terminal might receive a normal VoIP call (with data packets having e.g. DSCP=AF23, assured forwarding class) while being far from the access entity (and the associated gateway entity having a preset or signed $DSCP_{set,1}$ e.g.

=AF11), which may result in a small DL capacity, as shown in FIG. 5. Shortly after having accepted this normal call, an emergency VoIP call arrives (data packet's DSCP e.g. =EF PHB), which may cause the gateway entity to reconfigure the DSCP threshold $DSCP_{set,1}$ to e.g. AF24. By virtue of the present invention, however, rather than being dropped, the data packets of the normal VoIP call are queued in the assured forwarding class queue, while the data packets of the emergency VoIP call are relayed via the emergency forwarding class queue. Hence, the user is given the opportunity to hold the normal call while answering to the emergency call.

Generally speaking, a background service (e.g. automatic software update) may have its data packets queued in a low-priority queue (e.g. default BE class queue), and only when all queues having a higher priority do not send data packets (due to no higher priority traffic being present at that time, or due to suddenly improved availability of system resources), the background service is effected. By virtue of this behaviour, e.g. service stratification and real-time behaviour are improved.

Congestion Granularity:

Also following the above example with n=4, an end user of a terminal might be notified of a general congestion if a queuing entity e.g. in the gateway entity overflows, i.e. drops data packets because of lack of queuing capacity. By means of the present invention, this behaviour can be exploited. If e.g. the default class queuing entity and the selector class queuing entity indicate overflow, the terminal (and the end user) can be notified that data connections within the assured forwarding class or emergency class are still possible.

Generally speaking, overflow of a given queuing entity having a given priority indicates that all traffic having the given priority or a priority lower than the given priority can no longer be routed, and an appropriate notification can be given to the terminal (and the end user). By means of this feature, e.g. awareness of the terminal on the network status is improved.

The present invention may be summarized according to the following, with out being restricted to the details set out in the following: To prevent the data packet drop, any QoS enforcement mechanism should be configured to operate on larger time intervals, i.e. keeping a larger amount of states for a longer period of time. To this end, there are multiple options to implement data packet marking. One of them is to use separate R3/R4/R6 reference point connection (in which case up to n bits of e.g. the pair of source/destination addresses in the data packet header may be used), another option is to use different destination transport ports for conforming and non-conforming data packets (see above examples for DSCPs and flow rates). While the invention is not limited to specific marking algorithm and IP version, the above examples use the IPv4 TOS/IPv6 Traffic Class field for marking. The IPv4 TOS/IPv6 Traffic Class field consists of 8 bits. As stated above, the lower 6 bits (bit #0 to bit #5) are used for DSCP encoding, while the remaining two bits (bit #6 and bit #7) are defined as the ECN field. In the above particular example, e.g. TOS/Traffic Class bit #6 may be used for marking of conforming/non-conforming data packets. In the case of the access technology being compliant with the WiMAX architecture, the associated network elements would ignore the ECN field, but WiMAX-specific network elements (for example, the Serving ASN-GW 1012) would use the ECN field for QoS enforcing based on the method and entities shown in FIGS. 6 to 8.

To further sum up, according to the present invention, with out being restricted to the details set out in the following, loose and distributed QoS enforcement e.g. in WiMAX networks is proposed. This QoS enforcement comprises a QoS marking entity and a QoS enforcement entity. The purpose of QoS marking entity is e.g. to perform the first level of a DL rate limiting function, but instead of dropping all non-conforming data packets, these data packets are marked. The marking principle can, in addition to those described above, be similar to e.g. so-called Discard Eligibility bit method. The second level of QoS handling would prefer e.g. unmarked data packets, and only if enough network resources (bandwidth, processing power, etc.) are available, the second level would process also marked data packets.

The invention claimed is:

1. A method, comprising:
receiving a data stream consisting of a plurality of data packets, each of the plurality of data packets being marked with an identifier, wherein the identifier is configured to consist of $\lceil \log_2(n) \rceil$ bits of a data packet header, where $\lceil\ \rceil$ represents an operator for the upper next integer, and wherein a plurality of queuing entities is configured to consist of n queuing entities, n being an integer greater than 1;
enforcing each one of the plurality of data packets based on the respective identifier, wherein enforcing comprises:
  detecting the identifier in each one of the plurality of marked data packets; and
  queuing, responsive to the detecting, the data packets into one of the plurality of queuing entities, the queuing entities being prioritized with respect to each other;
scheduling, in each of the plurality of prioritized queuing entities, the respective queued data packets; and
causing transmission of the scheduled data packets in each of the plurality of prioritized queuing entities according to the priority of the respective queuing entity.

2. The method according to claim 1, wherein, in the receiving, each one of the plurality of data packets comprises at least an information element, and wherein the method further comprises marking each of the plurality of data packets with one of a plurality of identifiers based on a predetermined requirement, the plurality of identifiers corresponding to the plurality of queuing entities, the marking being performed in the respective information element.

3. The method according to claim 1, wherein at least causing transmission is based on Worldwide Interoperability for Microwave Access.

4. The method according to claim 2, wherein the marking comprises defining the predetermined requirement to be one of a predetermined Differentiated Services Codepoint and a predetermined data packet flow rate.

5. The method according to claim 2, wherein the marking and enforcing comprise defining the information element to consist of $\lceil \log_2(n) \rceil$ bits of the data packet header, where $\lceil\ \rceil$ represents an operator for the upper next integer, and wherein the prioritizing and enforcing comprise defining the plurality of queuing entities to consist of n queuing entities, n being an integer greater than 1.

6. The method according to claim 5, wherein marking further comprises defining the information element to be at least a section of $\lceil \log_2(n) \rceil$ bits of the destination address of the data packet; and the method further comprising:
mapping the section of $\lceil \log_2(n) \rceil$ bits of the destination address of the data packet to a section of $\lceil \log_2(n) \rceil$ bits of the source address of the data packet;

wherein the enforcing comprises defining the information element to be at least the section of $\lceil \log_2(n) \rceil$ bits of the source address of the data packet.

7. The method according to claim 5, wherein the marking and enforcing comprise defining the information element to consist of up to both bits of the Explicit Congestion Notification Field of the data packet header, and the prioritizing and enforcing comprise defining the plurality of queuing entities to consist of up to four queuing entities.

8. The method according to claim 1, wherein the scheduling is based on the Differentiated Services Codepoint of the data packet header.

9. An apparatus comprising at least one processor and at least one memory including computer program code, the at least one memory and the computer program code configured to, with the at least one processor, direct the apparatus at least to:
receive a data stream consisting of a plurality of data packets, each one of the plurality of data packets received comprising at least an information element, wherein the information element is configured to consist of $\lceil \log_2(n) \rceil$ bits of a data packet header, where $\lceil \ \rceil$ represents an operator for the upper next integer, and wherein a plurality of queuing entities is configured to consist of n queuing entities, n being an integer greater than 1;
mark the respective information element of each of the plurality of data packets with one of a plurality of identifiers based on a predetermined requirement, the plurality of identifiers corresponding to the plurality of queuing entities; and
cause sending of the plurality of marked data packets.

10. The apparatus according to claim 9, wherein the apparatus directed to cause sending of the plurality of marked data packets is directed to cause sending of the plurality of marked data packets in accordance with Worldwide Interoperability for Microwave Access.

11. The apparatus according to claim 9, wherein the predetermined requirement is one of a predetermined Differentiated Services Codepoint and a predetermined data packet flow rate.

12. The apparatus according to claim 9, wherein the information element is configured to consist of at least a section of $\lceil \log_2(n) \rceil$ bits of the destination address of the data packet.

13. The apparatus according to claim 9, wherein the information element is configured to consist of up to both bits of the Explicit Congestion Notification Field of the data packet header, and the plurality of queuing entities is configured to consist of up to four queuing entities.

14. The apparatus according to claim 9, wherein the apparatus is chipset insertable.

15. An apparatus comprising at least one processor and at least one memory including program code, the at least one memory and the program code configured to, with the at least one processor, direct the apparatus at least to:
receive a data stream consisting of a plurality of data packets, each of the plurality of data packets being marked with an identifier, wherein the identifier is configured to consist of $\lceil \log_2(n) \rceil$ bits of a data packet header, where $\lceil \ \rceil$ represents an operator for the upper next integer, and wherein a plurality of queuing entities is configured to consist of n queuing entities, n being an integer greater than 1;
enforce each one of the plurality of data packets based on the respective identifier, wherein the apparatus directed to enforce is further directed to:
detect the identifier in each one of the plurality of marked data packets; and
queue, responsive to detecting the identifier, the data packets into one of the plurality of queuing entities, the queuing entities being prioritized with respect to each other;
schedule, in each of the plurality of prioritized queuing entities, the respective queued data packets; and
cause transmission of the scheduled data packets in each of the plurality of prioritized queuing entities according to the priority of the respective queuing entity.

16. The apparatus according to claim 15, wherein the apparatus directed to cause transmission of the scheduled data packets include being directed to cause transmission of the scheduled data packets in accordance with Worldwide Interoperability for Microwave Access.

17. The apparatus according to claim 15, wherein the identifier is configured to consist of at least a section of $\lceil \log_2(n) \rceil$ bits of the source address of the data packet.

18. The apparatus according to claim 15, wherein the identifier is configured to consist of up to both bits of the Explicit Congestion Notification Field of the data packet header, and the plurality of queuing entities is configured to consist of up to four queuing entities.

19. The apparatus according to claim 15, wherein the apparatus directed to schedule the respective queued data packets include being directed to schedule based on the Differentiated Services Codepoint of data packet headers.

20. The apparatus according to claim 15, wherein the apparatus is chipset insertable.

21. A network element, comprising:
the apparatus according to claim 9; and
the apparatus according to claim 15.

22. An apparatus, comprising:
means for receiving a data stream consisting of a plurality of data packets, each one of the plurality of data packets received comprising at least an information element, wherein the information element is configured to consist of $\lceil \log_2(n) \rceil$ bits of a data packet header, where $\lceil \ \rceil$ represents an operator for the upper next integer, and wherein a plurality of queuing entities is configured to consist of n queuing entities, n being an integer greater than 1;
means for marking the respective information element of each of the plurality of data packets with one out of a plurality of identifiers based on a predetermined requirement, the plurality of identifiers corresponding to the plurality of queuing entities; and
means for causing sending of the plurality of marked data packets.

23. An apparatus, comprising:
means for receiving a data stream consisting of a plurality of data packets, each of the plurality of data packets being marked with an identifier, wherein the identifier is configured to consist of $\lceil \log_2(n) \rceil$ bits of a data packet header, where $\lceil \ \rceil$ represents an operator for the upper next integer, and wherein a plurality of means for queuing are configured to consist of n means for queuing, n being an integer greater than 1;
means for enforcing each one of the plurality of data packets based on the respective identifier, the means for enforcing further comprising:
means for detecting the identifier in each one of the plurality of marked data packets; and
the plurality of means for queuing being prioritized with respect to each other, and for queuing, responsive to the means for detecting, the data packets into one of the plurality of prioritized means for queuing;

means for scheduling, in each of the plurality of prioritized means for queuing, the respective queued data packets; and means for causing transmission of the scheduled data packets in each of the plurality of prioritized means for queuing according to the priority of the respective means for queuing.

24. A network element, comprising:

the means for constituting the apparatus according to claim 22; and the means for constituting the apparatus according to claim 23.

25. A computer-readable memory having a computer program stored therein, the computer program configured to control a processor to cause the processor to perform:

receiving a data stream consisting of a plurality of data packets, each of the plurality of data packets being marked with an identifier, wherein the identifier is configured to consist of $\lceil \log_2(n) \rceil$ bits of a data packet header, where $\lceil\ \rceil$ represents an operator for the upper next integer, and wherein a plurality of queuing entities is configured to consist of n queuing entities, n being an integer greater than 1;

enforcing each one of the plurality of data packets based on the respective identifier, wherein enforcing comprises:
    detecting the identifier in each one of the plurality of marked data packets; and
    queuing, responsive to the detecting, the data packets into one of the plurality of queuing entities, the queuing entities being prioritized with respect to each other;

scheduling, in each of the plurality of prioritized queuing entities, the respective queued data packets; and causing transmission of the scheduled data packets in each of the plurality of prioritized queuing entities according to the priority of the respective queuing entity.

26. The computer readable memory according to claim 25, wherein the computer-readable memory is configured to facilitate loading the computer program into an internal memory of a network element.

* * * * *